United States Patent [19]
Schlichte

[11] 3,761,633
[45] Sept. 25, 1973

[54] TIME MULTIPLEX COUPLING ARRANGEMENT FOR THE CONNECTION OF MULTIPLE BUSES OF A TIME MULTIPLEX TELEPHONE EXCHANGE

[75] Inventor: Max Schlichte, Munich, Germany

[73] Assignee: Siemens Aktiengesellschaft, Berlin and Munich, Germany

[22] Filed: July 19, 1971

[21] Appl. No.: 163,584

[30] Foreign Application Priority Data

July 21, 1970 Germany .................. P 20 36 115.3

[52] U.S. Cl. ........................ 179/15 AA, 179/15 AT
[51] Int. Cl. ............................................ H04j 3/00
[58] Field of Search .................. 179/15 AA, 15 AT, 179/15 AQ, 18 GF, 18 J

[56] References Cited

UNITED STATES PATENTS

| | | | |
|---|---|---|---|
| 3,275,749 | 9/1966 | Kunihiro | 179/15 AT |
| 3,280,262 | 10/1966 | Von Sanden | 179/15 AT |
| 3,535,457 | 10/1970 | Poschenrieder | 179/15 AQ |
| 3,413,418 | 11/1968 | Gaunt | 179/15 AA |
| 3,461,243 | 8/1969 | Hoschler | 179/15 AA |

FOREIGN PATENTS OR APPLICATIONS

| | | | |
|---|---|---|---|
| 1,098,545 | 2/1961 | Germany | 179/18 GF |
| 1,171,333 | 11/1969 | Great Britain | 179/15 AT |

*Primary Examiner*—Kathleen H. Claffy
*Assistant Examiner*—David L. Stewart
*Attorney*—Harold J. Birch et al.

[57] ABSTRACT

A time multiplex coupling arrangement for telecommunications exchange installations is described. The coupling arrangement permits transmission of time multiplex signals, particularly pulse code modulated (PCM) signals. N multiplex buses are provided and have individually associated therewith N connection buses. The connection buses are terminated at one end with a storage capacitor. A predetermined number coupling stages are formed, and each of these have a related number of coupling circuits, which coupling circuits are formed as capacitive cross-charging circuits. The coupling circuits may have recharging circuits connected on either side of a coupling point switch.

6 Claims, 5 Drawing Figures

United States Patent [19]
Schlichte
[11] 3,761,633
[45] Sept. 25, 1973
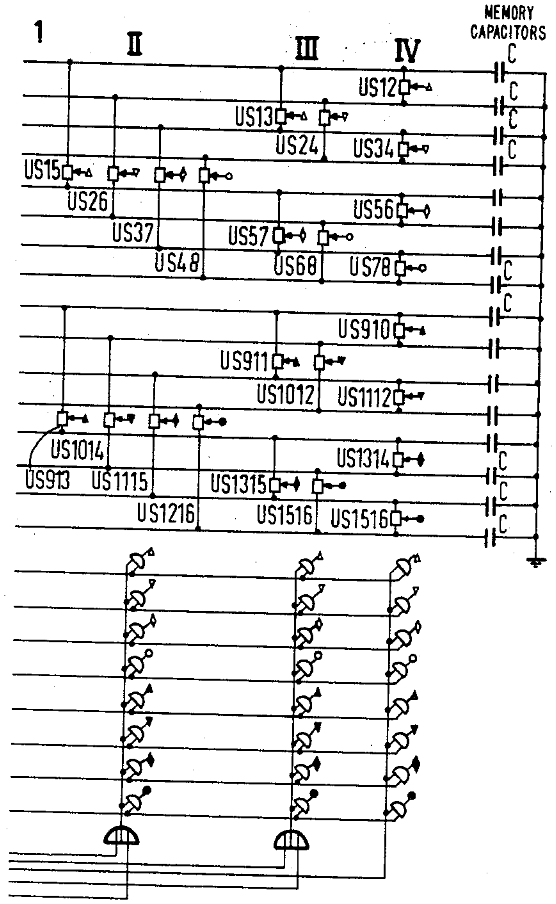

TIME MULTIPLEX COUPLING ARRANGEMENT FOR THE CONNECTION OF MULTIPLE BUSES OF A TIME MULTIPLEX TELEPHONE EXCHANGE

BACKGROUND OF THE INVENTION

This invention relates to time multiplex exchange installations for use in telephone technology.

In such exchange installations, after modulation of time-related pulse sequence with the information to be transmitted, several transmission channels are bundled in time on a multiplex bus. The significant components of such exchange installations are the coupling arrangements. These are arrangements of switching members having the function of selectively connecting multiplex buses with the time channels correctly corresponding to the desired connections. Each connection is brought about by appropriate, periodic pulsed activation of one or more coupling point switches in the coupling arrangement.

Coupling point switches of this type can be arranged in the time multiplex-coupling arrangement in the form of a switching matrix, i.e., in an arrangement, in which a certain input (switching matrix row line) has access to a certain output (switching matrix column line) over a (two or four wire) coupling point switch. The switch lies at the cross point of the affected switching matrix row line with the affected switching matrix column line (see for example, British Patent No. 981 175, FIG. 2). A switching matrix of this type with N/2 switching matrix rows and N/2 switching matrix columns requires $N/2 \cdot N/2$ coupling point switches. The coupling point switches of a time multiplex coupling arrangement for a total of N lines can also be arranged in the form of a so-called triangle matrix ( see Proceedings of the IEEE, part B, supplement, Nov. 1960, page 96, FIG. 3), whereby, $N/2 \cdot (N-1)$ coupling point switches are then required. Finally, in an intermediate line coupling arrangement, the number of coupling point switches is dependent on the number and on the type of intermediate lines; for example, with N/2 intermediate lines, each having access to all N lines, the number of coupling point switches amounts to $N/2 \cdot N$ coupling point switches.

In determining the size of a telephone exchange installation, it is well known that operational as well as economic points of view must be considered. An exchange must be so equipped that it is capable of satisfying the accumulated traffic load, while maintaining a prescribed quality of traffic developments. However, the capital outlay for the exchange should be as small as possible.

It is an object of the invention to provide a time multiplex coupling arrangement to be utilized in a time multiplex-telephone exchange, which will be inexpensive to construct and operate.

It is another object of this invention to provide a time multiplex telephone exchange which achieves the aforementioned economic goals by reducing the cost of the coupling arrangement and by reducing the amount of supporting data needed to maintaln connections.

SUMMARY OF THE INVENTION

The aforementioned and other objects are attained in a time multiplex coupling arrangement for the connection of multiplex buses in a time multiplex telecommunication exchange, transmitting PCM signals. In this time multiplex coupling arrangement, in accordance with the invention, N multiplex buses are provided, and N connection buses are each individually associated with a multiplex bus. The connection buses are associated in each instance with a memory, and a coupling circuit, developed in each case as a cross charging circuit, is connected to the connection buses in each of $S = 1dN$ coupling stages, each stage having N/2 coupling circuits. By this means, an s-th coupling stage with $s = 1, 2, \ldots 1dN$, and an $n$-th connection bus with $n = 1, 2, \ldots N$ can be connected with the $(N/2+n)$-th connection bus wherein $2rN/2^s < n \leq (2r+1)\, N/2^s$, with $r$ equal to $0, 1, 2, \ldots (2^{s-1})$, only during the s-th and during the $(2 \cdot 1dN-s)$-th time elements of a periodically repeating series of $2 \cdot 1dN$ time frames. In the $(2 \cdot 1dN)$-th time element, the input to the time multiplex coupling arrangement of time multiplex signal elements which are to be switched through, or the output from the time multiplex coupling arrangement of time multiplex signal elements which have been switched through takes place.

The invention has the advantage of requiring a relatively small expenditure of only $N/2 \cdot 1dN$ coupling point switches for the connection of N multiplex buses and of requiring a correspondingly small amount of the supporting data necessary for the maintenance of connections. An additional advantage of always being able to route all possible connections of two multiplex buses over the time multiplex coupling arrangement in all possible connection combinations, if necessary, following a rearrangement of the connections already routed over the time multiplex coupling arrangement, which thus, is insofar free of blocking is obtained, as well.

It is to be noted here, that the invention is based on a principle which has independent meaning, even beyond the realm of the above defined time multiplex coupling arrangement. This principle contemplates replacing the binary switching matrices of a well-known coupling arrangement, which has merely a plurality of switching matrices and in each case has only two first and two second lines, by a cross charging circuit in each case. The principle includes controlling the two first lines and the two second lines at mutually displaced points of time.

In the switching matrices of the known coupling arrangement, the one first line is connected with one or with the other secondary line, and the other first line is connected with the other or with the first second line (uncrossed or crossed through-switching). The binary switching matrices are connected among themselves in such a way that the two second lines of a preceding switching matrix are connected with a first line of each of two following switching matrices, and in each case the two first lines of a following switching matrix are connected with a second line of two preceding switching matrices. The cross-charging circuit is connected on the one hand to the one first (primary) line and to the one second (secondary) line and on the other hand, to the other first (primary) line and to the other second (secondary) line.

In a further embodiment of the invention, the multiplex buses can be connected with a memory, which can be connected to the associated connection bus through a cross-charging circuit and which can be activated only during the $(2 \cdot 1dN)$-th time element of the time frame. It is hereby achieved that in the input or output of time multiplex signal elements, which are to be or have been switched, use is also made of the principle of memory cross-charging, and thereby, use is made of a unified transmission technique during the entire switching of the signal through the time multiplex coupling arrangement.

In a further embodiment of the invention, the time multiplex coupling arrangement can contain cross-charging circuits which in each instance have a recharging circuit on both sides of a coupling point switch. The coupling circuits formed by such cross-charging circuits and connected to one and the same connection bus can thereby have a common recharging circuit, which is inserted between the memory formed as a condenser closing the pertinent connection bus, and the coupling point switches of the pertinent coupling circuits which are connected to the pertinent connection bus. The utilization of such charging circuits common to several cross-charging circuits keeps the circuitry expense relatively low.

In addition to the development of a cross-charging circuit as a recharging circuit (as is known, for example, from U.S. Pat. No. 3,303,286) in further embodiments of the invention, a cross-charging circuit can also be developed as a resonant cross charging circuit, whereby, in order to reduce the necessary circuitry expenditures, the coupling circuits connected to one and the same connection bus can have a common resonance which is inserted in series between the memory developed as a condenser and terminating the pertinent connection bus and the coupling point switches of the pertinent coupling circuits connected to the pertinent connection bus.

BRIEF DESCRIPTION OF THE DRAWINGS

The principles of the invention will be better understood by reference to the description of a preferred embodiment given hereinbelow in conjunction with the drawings in which.

DETAILED DESCRIPTION OF A PREFERRED EMBODIMENT

Figure 1A:
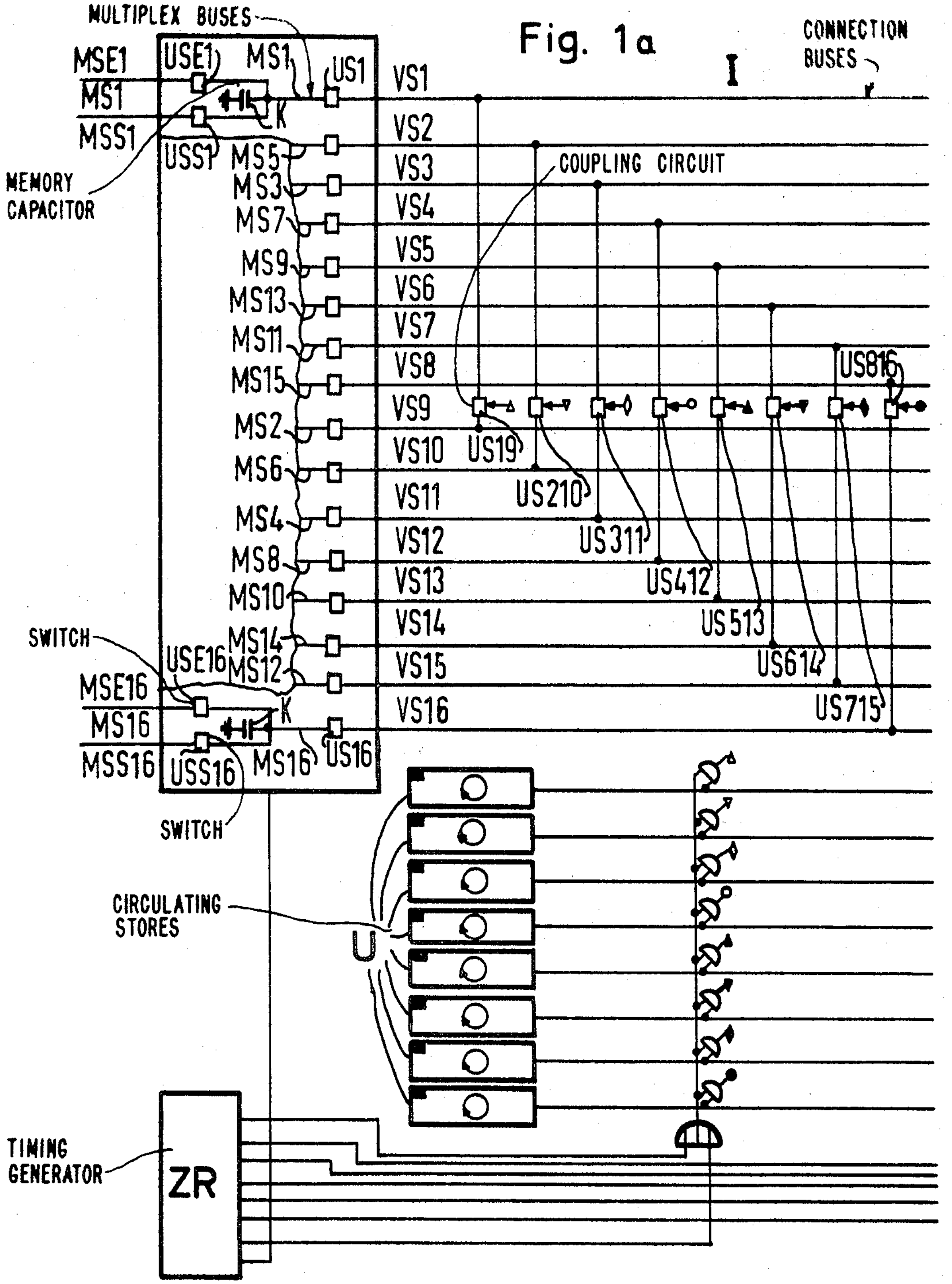
FIG. 1, constituted by FIGS. 1*a* and 1*b* with FIG. 1*b* being viewed on the right of FIG. 1*a*, is a schematic diagram of a time multiplex coupling arrangement constructed according to the invention.
Figure 1B:
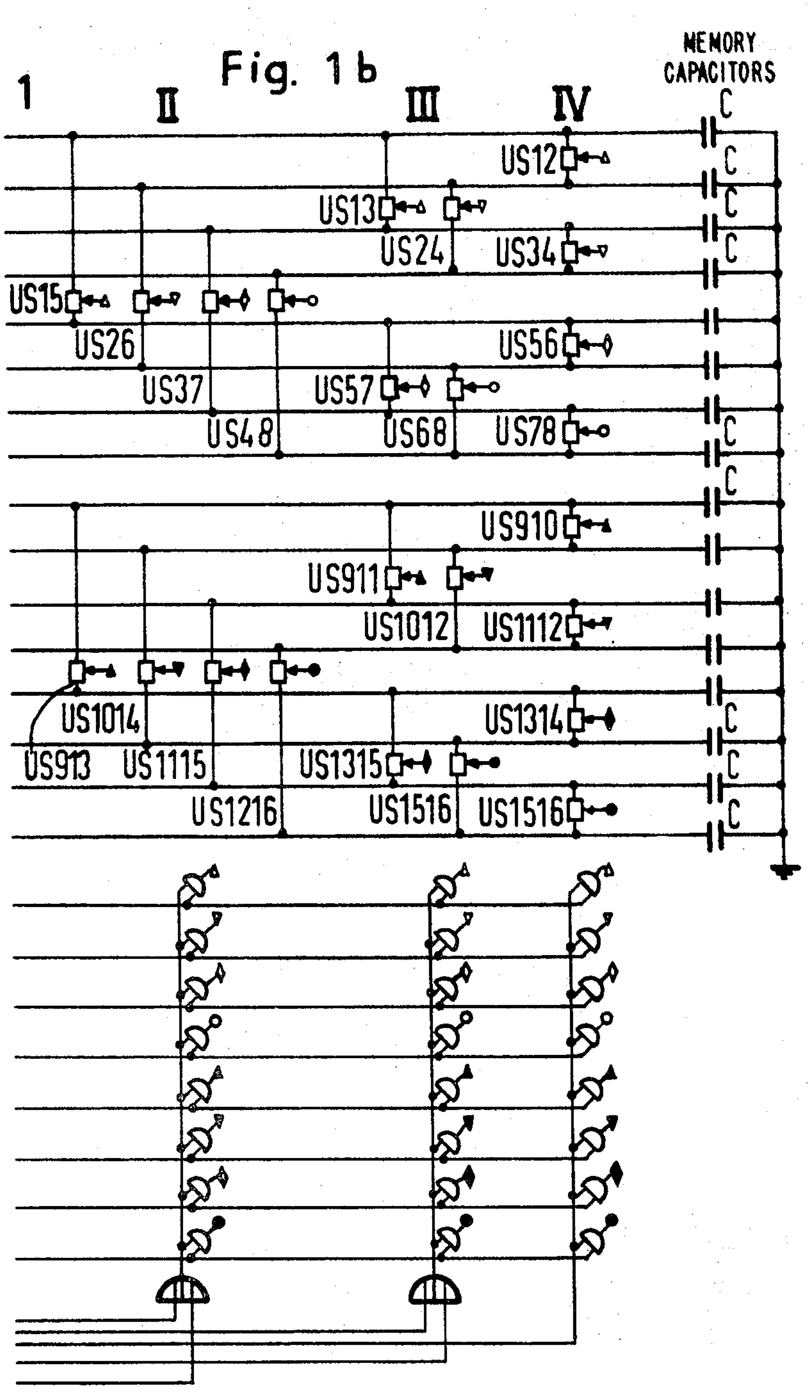

FIG. 1 illustrates the circuitry details of a preferred embodiment of a time multiplex coupling arrangement constructed according to the principles of the invention. This time multiplex coupling arrangement has $N = 16$ multiplex buses MS1...MS16. Each multiplex bus MS is provided with an individually associated connection bus VS: multiplex bus MS1 is connected to connection bus VS1, multiplex bus MS5 is connected to connection bus VS2, multiplex bus MS3 is connected to connection bus VS3, multiplex bus MS7 is connected to connection bus VS4, multiplex bus MS9 is connected to connection bus VS5, multiplex bus MS13 is connected to connection bus VS6, multiplex bus MS11 is connected to connection bus VS7, multiplex bus MS15 is connected to connection bus VS8, multiplex bus MS2 is connected to connection bus VS9, multiplex bus MS6 is connected to connection bus VS10, multiplex bus MS4 is connected to connection bus VS11, multiplex bus MS8 is connected to connection bus VS12, multiplex bus MS10 is connected to connection bus VS13, multiplex bus MS14 is connected to connection bus VS14, multiplex bus MS12 is connected to connection bus VS15, and multiplex bus MS16 is connected to connection bus VS16.

The connection buses VS1...VS16 are terminated in each case with a memory developed as a capacitor C. Coupling circuits US19... US1516 are connected across various of the connection buses VS1...VS16. The coupling circuits are arranged in $S$=1d, $N$=4 coupling stages with $N/2=8$ coupling circuits US in each case, where S equals the number of coupling stages and N equals the number of connection and multiplex buses. These coupling circuits are developed as cross-charging circuits, i.e., as circuits which make possible a practically loss free charge exchange between two capacitors serving as memories. This can involve, thereby, without the necessity of it being shown in detail in FIG. 1, a cross-charging circuit having a recoupling or recharging circuit on both sides of a coupling point switch.

Cross-charging circuits of this type are described, for example, in U.S. Pat. No. 3,303,286 and British Patent No. 1,164,337. They are based on the principle that the pulsed transmissions of energy between terminals provided with storage capacitors, over at least one periodically activatable switch at, at least, one terminal, the storage capacitor is supplemented by a dipole containing at least one supplementary reactance, as well as a supplementary energy source together with an amplifier element. In this dipole the supplementary energy source together with the amplifier element supplies the reactance of the dipole with energy during the time period before the energy transmission in dependence on the energy passed to or taken from the storage capacitor. This is done in such a way that in such reactances energy corresponding to the energy passed to the storage capacitor is made ready and during the subsequent brief energy transmission, the energy contained in the reactances takes effect therewith, so that a practically loss free exchange of charge takes place between the two storage capacitors. To this end, auxiliary capacitors can be provided and connected in parallel with these storage capacitors, as well as an auxiliary current source. The auxiliary current source supplies each auxiliary capacitor with energy through an amplifier element connected to the pertinent storage capacitor and controllable by the storage capacitor's charge condition in such a way that a voltage corresponding to the voltage applied to the storage capacitor is applied to the auxiliary capacitor. During the comparatively brief subsequent energy transmission the energy contained in the auxiliary capacitor takes effect therewith.

Figure 3:
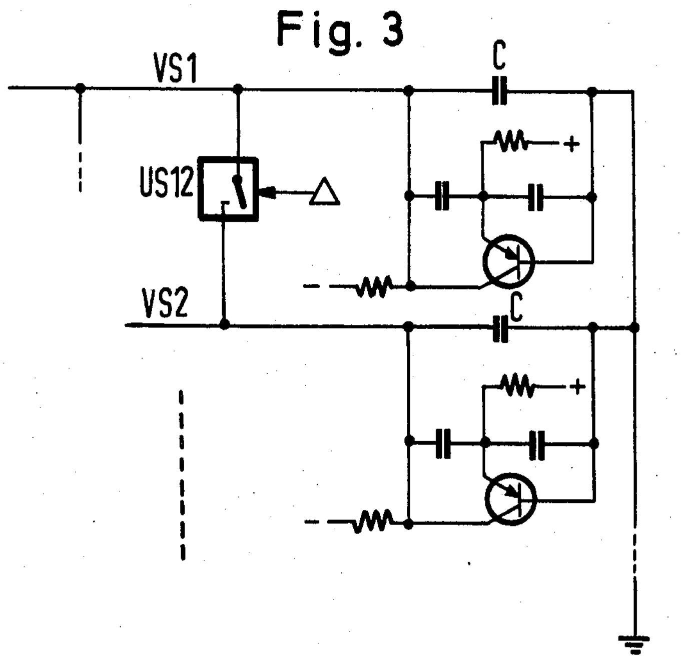
FIG. 3 is a schematic view of a preferred embodiment of the cross-charging circuit US illustrated in the figure embodiment.
Figure 4:
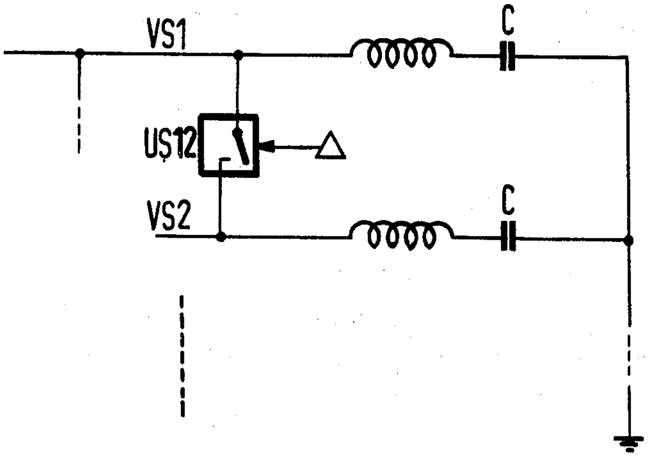
FIG. 4 is a schematic diagram of an alternate embodiment for the cross-charging circuit.

The small rectangles in FIG. 1 designated with US symbolize such a cross-charging circuit which is illustrated in FIG. 3. In the latter figure each cross-charging circuit is shown to contain in each case a coupling point switch U.S. and on both sides of this coupling point switch, for example, a series circuit parallel to each storage capacitor C terminating the given connection bus. This series circuit comprises an auxiliary capacitor and a coupling capacitor, and these two capacitors are connected in parallel to the collector-base path of a transistor, the emitter of which is connected to the junction point of the auxiliary capacitor and the coupling capacitor.

Advantageously, however, the coupling circuits US connected to one and the same connection bus VS have a common recharging circuit, which is inserted between the storage capacitor C and the coupling point switch of the pertinent coupling circuit connected to the pertinent connection bus VS. In the circuit arrangement according to FIG. 1, the small rectangles designated US each contain only the actual coupling point switch and a recharging circuit is connected directly before each of the storage capacitors C, in that in the above detailed development of the recharging circuit, the series circuit of an auxiliary capacitor and a coupling capacitor is arranged in parallel to the storage capacitor C with the coupling capacitor connected across the collector-base path of a transistor, the emitter of which lies at the connection point of the auxiliary capacitor and the coupling capacitor.

Deviating from the above described development of the cross-charging circuits US, cross-charging circuits can also be provided which are developed as resonant cross-charging circuits in the time multiplex coupling arrangement according to the invention. In this arrangement, a cross charging circuit, such as represented in FIG. 1 as a small rectangle designated US, contains a coupling point switch in series with a resonant coil, or the coupling circuits connected to one and the same connection bus have a common resonant coil which is inserted in series the storage capacitors C terminating the pertinent coupling circuits connected to the pertinent connection buses VS.

In the time multiplex coupling arrangement according to FIG. 1, there are four coupling stages I, II, III, IV each having eight coupling circuits constructed as cross-charging circuits US. In the first coupling stage I, the connection bus VS1 can be connected with the connection bus VS9, the connection bus VS2 can be connected with the connection bus VS10, the connection bus VS3 can be connected with the connection bus VS11, the connection bus VS4 can be connected with the connection bus VS12, etc. In each case, the latter connections are made over a cross-charging circuit US lying between the pertinent connection buses. That is to say, in each case an $n$-th connection bus, can be connected with the $(N/2+n)$-th connection bus, whereby, 0 is less than $n$ is less than or equal to N/2.

In the coupling stage II, the connection buses VS1 and VS5, VS2 and VS6, VS3 and VS7, VS4 and VS8, VS9 and VS13, etc., can be connected with each other in each case over a cross charging circuit US. That is to say, generally, an $n$-th connection bus can be connected to the $(N/4+n)$th connection bus, whereby, $2rN/4$ is less than n is less than or equal to $(2r+1)N/4$ with $n=0, 1$.

In the coupling stage III, the connection buses VS1 and VS3, VS2 and VS4, VS5 and VS7, etc., can be connected with each other in each case, over a cross-charging circuit US. That is to say, in each case an $n$-th connection bus can be connected with the $(N/8+n)$-th connection bus, whereby $2rN/8$ is less than n is less than or equal to $(2r+1)N/8$ with $r=0, 1, 2$.

In the coupling stage IV, the connection buses VS1 and VS2, VS3 and VS4, etc., can be connected with each other in each case over a cross-charging circuit US. That is to say, an $n$-th connection bus can be connected to the $(N/16+n)$-th connection bus, wherein $2rN/16$ is less than $n$ is less than or equal to $(2r+1)N/16$ with $r=0, 1, 2, 3$.

Thus, generally expressed, in a time multiplex coupling arrangement, including N connection buses, with $S=1dN$ coupling stages, each consisting of N/2 circuits developed as cross-charging circuits with $s=1, 2, \ldots S$ and $n=1, 2, \ldots N$, in any given case a $n$-th connection bus VS can be connected to the $(N/2^{s+r})$-th connection bus VS, wherein, $2rN/2^s<n \leq (2r+1)N/2^s$ with $r=0, 1, 2, \ldots(2^{s-1}-1)$. The cross-charging circuits US of an $s$-th coupling stage can be activated only during the $n$-th and during the $(2\cdot 1dN-s)$-th time elements of a periodically repeating series of $2\cdot 1dN$ time frames. Therefore, the pertinent connection buses in the pertinent coupling stages can also be connected to each other only during these time elements.

In the time multiplex coupling arrangement according to FIG. 1, the cross-charging circuits US19, US210, US311, US412, US513, US614, US715, US816 of the coupling stage I, can thus be activated only during the first and during the 7th time elements of an eight element time frame; the cross-charging circuits US15, US26, US37, US 48, US913, US1014, US1115, US1216 of the coupling stage II can be activated only during the second and during the sixth time elements of the time frame; the cross-charging circuits US13, US24, US57, US68, US911, US1012, US1315, US1416 of the coupling stage III can be activated only during the third and during the fifth time elements of the time frame; and the cross-charging circuits US12, US34, US56, US78, US910, US1112, US1314, US1516 of the coupling stage IV can be activated only during the fourth time element of the time frame extending over eight time elements.

In FIG. 1, it is pointed out that the individual cross-charging circuits US are controlled from connecting circuits, which are actuated by a timing generator ZR only at the appropriate time element of the time frame and to which the necessary activation signals for the associated cross-charging circuits US are passed from the address circulation store U, the circulation time corresponds to the time channel. As pointed out in FIG. 1, corresponding to the number of the cross-charging circuits in the individual coupling stages, $N/2=8$ circulating stores U are provided. The timing generator and circulating store may be of known construction so that they will not be described further herein.

The input of time multiplex signal elements to be switched through into the time multiplex coupling arrangement or the output of time multiplex signal elements which have been switched through from the time multiplex coupling arrangement takes place in the $(2\cdot 1dN)$-th time element of the time frame. In the circuit arrangement according to FIG. 1, the multiplex buses MS are terminated with a memory K developed as a capacitor which can be connected to the associated connection bus VS1...VS16 over a cross-charging circuit US1...US16 which can be activated only during the given $(2\cdot 1dN)$-th time element of the time frame. Thus, these cross-charging circuits US1...US16 are actuated by the last output of the timing generator ZR only during the last time element of the time frame.

The multiplex buses MS1...MS16 can be developed as four wire lines whereby, and as is also indicated in FIG. 1, the multiplex sending line MSS and the multiplex receiving line MSE of such a four wire multiplex bus MS can be connected to the storage capacitor K closing the multiplex bus MS over switches USS, USE which can be activated at mutually displaced times.

It is now assumed for the sake of example, that in the course of connections routed directed through the time multiplex coupling arrangement according to FIG. 1, a signal element 1 is to be transmitted from the multiplex bus MS1 to the multiplex bus MS16, and a signal element 0 is to be transmitted from the multiplex bus MS16 to the multiplex bus MS1; a signal element 0 is to be transmitted from the multiplex bus MS5 to the multiplex bus MS3, and a signal element 1 is to be transmitted from the multiplex bus MS3 to the multiplex bus MS5; from the multiplex bus MS8 to the multiplex bus MS10 a signal element 0 is to be transmitted and from the multiplex bus MS10 to the multiplex bus MS8, a signal element 0 is likewise to be transmitted; from the multiplex bus MS9 to the multiplex bus MS14 a signal element 0, and from the multiplex bus MS14 to the multiplex bus MS9 likewise a signal element 0 is to be transmitted; a signal element 0 is to be transmitted from the multiplex bus MS15 to the multiplex bus MS2, and a signal element 1 is to be transmitted from the multiplex bus MS2 to the multiplex bus MS15; a signal element 1 is to be transmitted from the multiplex bus MS7 to the multiplex bus MS11, and a signal element 1 is to be transmitted from the multiplex bus MS11 to the multiplex bus MS7; a signal element 1 is to be transmitted from the multiplex bus MS13 to the multiplex bus MS12, and a signal element 0 is to be transmitted from the multiplex bus MS12 to the multiplex bus MS13; and a signal element 1 is to be transmitted from the multiplex bus MS6 to the multiplex bus MS4, and a signal element 1 is to be transmitted from the multiplex bus MS4 to the multiplex bus MS6.

To begin with, these signal elements pass in the last time segment of a preceding time frame over the cross-charging circuits US1...US16 from the storage capacitors K of the pertinent multiplex buses M to the storage capacitors C of the associated connection buses VS.

In the first time segment of the following time frame, the cross-charging switches US412, US513, US715 and US816 lying in the first coupling stage I are then controlled from the circulating stores U over the first column of connecting circuits released during this time segment and are thereby, pulsed closed. This causes an exchange of charge to take place in each case between the storage capacitors C of the connection buses VS4 and VS12, VS5 and VS13, VS7 and VS15, as well as VS8 and VS16.

In the second time element of the time frame, the cross-charging circuits US15 and US1216 belonging to the second coupling stage II, are controlled and activated by pulses from the circulating stores U over the connection circuits of the second column of connection circuits released during this time element, so that an exchange of charge takes place in each case between the storage capacitors C of the connection buses VS1 and VS5 as well as VS12 and VS15.

In the following third time element of the time frame of the cross-charging circuits US24, US68 and US911 belonging to the coupling stage III, are activated in a corresponding manner, so that an exchange of charge takes place between the storage capacitors C of the connection buses VS2 and VS4, VS6 and VS8 as well as VS9 and VS11.

In the fourth time element of the time frame, the cross-charging circuits US12, US34, US56, US78, US910, US1112, US1314, US1516, belonging to the fourth coupling stage IV are activated, so that an exchange of charge takes place in each case between the storage capacitors of the connection buses VS1 and VS2, VS3 and VS4, VS5 and VS6, VS7 and VS8, VS9 and VS10, VS11 and VS12, VS13 and VS14, VS15 and VS16.

In the successive following fifth time elements of the time frame the cross-charging switches US24, US68, US911 of the coupling stage III, are activated, so that an exchange of charge takes place in each case between the storage capacitors C of the connection buses VS2 and VS4, VS6 and VS8, as well as VS9 and VS11.

In the sixth time element of the time frame, the cross-charging circuits US15 and US1216 of the coupling stage II are activated, so that an exchange of charge takes place between the storage capacitors C of the connection buses VS1 and VS5, as well as VS12 and VS16.

In the following seventh time segment of the time frame, the cross-charging circuits US412, US513, US715 and US816 of the coupling stage I are finally activated in a corresponding manner, so that an exchange of charge between the storage capacitors C of the connection buses VS4 and VS12, VS5 and VS13, VS7 and VS15 as well as VS8 and VS16 takes place.

In the following last or eighth time segment, of the time frame being considered, the cross-charging switches US1...US16 are finally activated by pulses again, so that an exchange of charge between the storage capacitors C of the connection buses VS1... VS16 and the storage capacitors K of the associated multiplex buses MS1...MS16 takes place, whereupon in the next time frame the above described sequence of operations take place in the time multiplex arrangement.

In the individual time elements of the time frame being considered, the signal elements to be transmitted between the given multiplex buses have thereby taken the following path from connection bus to connection bus:

| | I | | II | | III | | IV | | V | | VI | | VII | |
|---|---|---|---|---|---|---|---|---|---|---|---|---|---|---|
| 1 | → | 1 | → | 5 | → | 5 | → | 6 | → | 8 | → | 8 | → | 16 |
| 16 | → | 8 | → | 8 | → | 6 | → | 5 | → | 5 | → | 1 | → | 1 |
| 2 | → | 2 | → | 2 | → | 4 | → | 3 | → | 3 | → | 3 | → | 3 |
| 3 | → | 3 | → | 3 | → | 3 | → | 4 | → | 2 | → | 2 | → | 2 |
| 12 | → | 4 | → | 4 | → | 2 | → | 1 | → | 1 | → | 5 | → | 13 |
| 13 | → | 5 | → | 1 | → | 1 | → | 2 | → | 4 | → | 4 | → | 12 |
| 5 | → | 13 | → | 13 | → | 13 | → | 14 | → | 14 | → | 14 | → | 14 |
| 14 | → | 14 | → | 14 | → | 14 | → | 13 | → | 13 | → | 13 | → | 5 |
| 8 | → | 16 | → | 12 | → | 12 | → | 11 | → | 9 | → | 9 | → | 9 |
| 9 | → | 9 | → | 9 | → | 11 | → | 12 | → | 12 | → | 16 | → | 8 |
| 4 | → | 12 | → | 16 | → | 16 | → | 15 | → | 15 | → | 15 | → | 7 |
| 7 | → | 15 | → | 15 | → | 15 | → | 16 | → | 16 | → | 12 | → | 4 |
| 6 | → | 6 | → | 6 | → | 8 | → | 7 | → | 7 | → | 7 | → | 15 |
| 15 | → | 7 | → | 7 | → | 7 | → | 8 | → | 6 | → | 6 | → | 6 |
| 10 | → | 10 | → | 10 | → | 10 | → | 9 | → | 11 | → | 11 | → | 11 |
| 11 | → | 11 | → | 11 | → | 9 | → | 10 | → | 10 | → | 10 | → | 10 |

Figure 2:
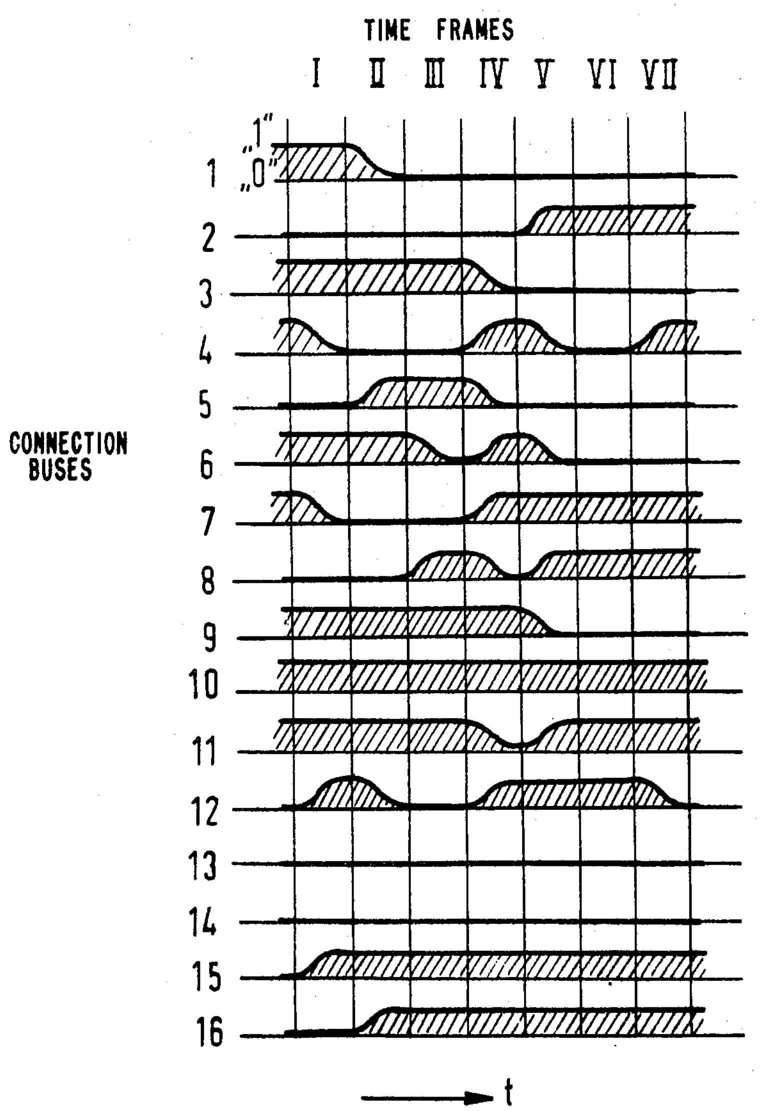
FIG. 2 is a chart illustrating the signal conditions resulting on the individual connection buses of the time multiplex coupling arrangement of FIG. 1 at the switching of given signal elements in a certain connection combination.

On the individual connection buses VS1...VS16 or the storage capacitors C, which terminate them, in the individual time elements I, II, III, IV, V, VI, VII, signal conditions are maintained as shown in the lines 1 through 16 in FIG. 2.

The time multiplex coupling arrangement according to FIG. 1 also works in a corresponding manner in the remaining time frames of a time channel period as well as in the remaining time channel periods in the transmission of further signal elements in the same or in other transmission channels. Thereby, connections between the individual multiplex buses MS1...MS16, can always, if necessary, after a rearrangement of already existing connections, be produced in all possible connection combinations.

The explanatory example given in FIG. 1 of a time multiplex coupling arrangement according to the invention is represented in single line form. In this form, the time multiplex coupling arrangement is adapted for the transmission of Δ M signal elements or of PCM signal elements arising in a series in time (PCM-word in series representation ). The time multiplex coupling arrangement can, however, also be developed in plural line form, in order to be able to transmit PCM-signal elements arising parallel in time (PCM-word in parallel representation). In all cases, the duration of a time frame corresponds to the duration of a signal element (bit), and the duration of a time element, which is critical for the dimensioning of the cross-charging circuit is equal to a fraction of the time frame duration corresponding to double the number of coupling stages of the time multiplex coupling arrangement.

The preferred embodiment described hereinabove is intended only to be exemplary of the principles of the invention, and must not in any way be considered as limiting the scope of the invention. The scope of the invention is defined by the appended claims, which will encompass changes in or modifications to the described preferred embodiment.

I claim:

1. A time multiplex coupling arrangement for the interconnection of busses transmitting multiplex signals in a telecommunication exchange installation, comprising:

a number N of multiplex buses, a number N of connection buses, each individually connected to a one of said multiplex buses, first storage capacitor means terminating each said connection bus, a number S of coupling stages, where S equal the logarithm to the base 2 of N, said coupling stages being individually represented by a numeral *s*, in a numerical order corresponding to their respective positions in the coupling arrangement, each said coupling stage comprising a number N/2 of coupling circuits, each said coupling circuit including cross-charging circuit means for connecting signals from one connection bus to another, the arrangement of said coupling circuits being such that in a s-th coupling stage a coupling circuit will connect a connection bus having a position represented by the numeral n in a numerical order indicating the relative positions of said connection buses in the connection arrangement to a connection bus having a position relative to said n-th connection bus represented by a numeral which is the result of $(N/2s + n)$, where $n$ satisfies the relationship:

$$2rN/2^s < n \leq (2r+1)N/2^s,$$

$r$ being a factor which is the result of $2^{s-1}$ for the $s$-th coupling stage, means for activating each of said coupling circuits in one of a periodically occurring series of 2S time elements, said coupling circuit connecting said nth connection bus to said $(N/2^s+n)$-th connection bus only during the s-th and (2S-s)th time elements, in said time frame series and means for coupling multiplex signals to be switched multiplex signals from the coupling arrangement only during the $2s$-th time element.

2. The coupling arrangement defined in claim 7, wherein said means for coupling includes:

second storage capacitor means terminating each said multiplex bus, cross charging circuit means connecting each said second storage capacitor to the multiplex bus associated therewith and means for activating said cross charging circuit means only during the 2S-th time frame.

3. The coupling arrangement defined in claim 1 wherein each said cross charging circuit comprises:

coupling point switch means and recharging circuit means connected on both sides of said coupling point switch.

4. The coupling arrangement defined in claim 3 wherein the ones of said coupling circuits connected to the same connection bus have a common recharging circuit connected between the first storage capacitor means for said same connection bus and the coupling circuits connected to said same connection bus.

5. The coupling arrangement defined in claim 1 wherein said cross-charging circuit includes a resonant circuit.

6. The coupling arrangement defined in claim 5 wherein coupling circuits connected to the same connection bus have a common resonant coil, said common resonant coil being inserted in series between said first storage means and the coupling point switches of said couping circuits connected to said same connection bus.

* * * * *